United States Patent [19]
Erko

[11] Patent Number: 5,940,928
[45] Date of Patent: Aug. 24, 1999

[54] SURFACE MAINTENANCE MACHINE WITH COMPUTER CONTROLLED OPERATIONAL AND MAINTENANCE SYSTEMS

[75] Inventor: Robert Erko, Apple Valley, Minn.

[73] Assignee: Tennant Company, Minneapolis, Minn.

[21] Appl. No.: 09/007,669

[22] Filed: Jan. 15, 1998

[51] Int. Cl.$^6$ .................................................. A47L 9/28
[52] U.S. Cl. .............................. 15/319; 15/320; 15/339
[58] Field of Search .............................. 15/319, 320, 339

[56] References Cited

U.S. PATENT DOCUMENTS

| | | | |
|---|---|---|---|
| 4,492,002 | 1/1985 | Waldhauser et al. | 15/320 |
| 5,023,973 | 6/1991 | Tsuchida et al. | 15/319 |
| 5,044,043 | 9/1991 | Basham et al. | 15/319 |
| 5,279,672 | 1/1994 | Betket et al. | 15/320 X |
| 5,301,385 | 4/1994 | Abe et al. | 15/339 X |
| 5,341,540 | 8/1994 | Soupert et al. | 15/320 X |
| 5,507,067 | 4/1996 | Hoekstra et al. | 15/339 X |
| 5,568,589 | 10/1996 | Hwang | 15/319 X |

*Primary Examiner*—Chris K. Moore
*Attorney, Agent, or Firm*—Dorn, McEachran, Jambor & Keating

[57] ABSTRACT

A surface maintenance machine has a cleaning system which includes a rotatable brush and a mechanism for raising and lowering it, and a drive for propelling the machine in forward and reverse directions. There is a visual control screen for use by the operator which has a plurality of display sectors, at least some of which display multiple information icons. There are a plurality of buttons for use by the operator, at least some of which are each associated with a specific display sector. A central processing unit is connected to the visual control screen, the control buttons, the drive for the brush, and the drive for propelling the machine. There are sensors connected to the central processing unit and positioned on the machine to determine operating conditions in the cleaning system and the propelling system. A microprocessor evaluates instructions received from operation of the control buttons and the operating conditions determined by the sensors, and then issues commands to the cleaning system for operating the brush, its drive, the mechanism for raising and lowering the brush, the propulsion system and other appropriate systems.

13 Claims, 3 Drawing Sheets

SURFACE MAINTENANCE MACHINE WITH COMPUTER CONTROLLED OPERATIONAL AND MAINTENANCE SYSTEMS

THE FIELD OF THE INVENTION

"Surface maintenance machines" broadly encompasses machines which will sweep an area such as a factory floor, hallway or the like, and machines which will perform a scrubbing function in that same environment. Surface maintenance machines also are designed to perform both scrubbing and sweeping functions. In the latter type of machine there are a number of specific functions that the operator must control in order to do a proper job. The operator must raise and lower the sweeping brush; raise and lower the scrubbing brush; raise and lower the squeegee to remove used cleaning solution and direct that solution to the recovery tank; control the speed and direction of the machine; and periodically clean the filter in the dust collection system and dump the debris hopper. Not only must the operator control all of these individual functions, but there are maintenance functions which must be periodically performed on the machine in order to keep it in its most efficient operating condition. All of the above functions, if they were to be individually controlled with separate control elements, would require a control panel of enormous complexity.

The present invention is designed specifically to provide multi-function control buttons which are positioned about a graphics display panel. Images on the display panel identify the current function of the peripheral buttons and these functions will change as the operator moves through different control and maintenance options. The intent of the present control system is to offer simplified control of sweeping and scrubbing, while reducing the number of controls confronting the operator. This is accomplished by using multi-function buttons in which the operator is only offered control of the functions which are appropriate for a specific task. The operator also has a menu button which allows him to scroll through the various operating and maintenance functions.

The invention will be described in connection with a machine which combines both scrubbing and sweeping functions. The concepts disclosed are equally applicable to a machine which only scrubs or only sweeps and it is broadly directed to a surface maintenance machine.

The operator is precluded from directing the machine to perform certain functions if the conditions to perform that function are not determined by sensors on the machine to be appropriate. For example, if the operator is using the machine in a sweeping mode, the hopper door is automatically open. It would be inappropriate for the operator to close the door while sweeping and so none of the multi-function buttons or switches are assigned to the hopper door when the machine is in a sweeping mode. On the other hand, if the operator directs the machine to lift the hopper, then the operator will have control of the hopper door. The microprocessor which receives input information from sensors, from the operator control buttons, and provides the signals to the various operating systems on the machine for both operation and maintenance purposes is programmed to assist the operator in both operating and maintaining the machine, but prevents the operator from directing the machine to perform functions which would be inappropriate considering a particular mode of operation.

SUMMARY OF THE INVENTION

The present invention relates to surface maintenance machines such as scrubbers, sweepers and combination machines which both sweep and scrub and more particularly relates to a simplified operator control system for both using the machine in its conventional cleaning tasks and providing maintenance for the machine at predetermined maintenance levels.

A primary purpose of the invention is a simplified computerized operator control system for a surface maintenance machine of the type described.

Another purpose is a surface maintenance machine having simplified operator controls including a graphic display screen and a plurality of multi-function buttons which function in cooperation with sensors on the machine to provide operator control of both operation and maintenance.

Another purpose is a surface maintenance machine as described which has sensors for determining machine operating parameters and operator control buttons, both connected to a central processing unit, with the processing unit issuing commands to operate the machine as determined by the operator when preconditions determined by the sensors have been met.

Another purpose is a surface maintenance machine operation and maintenance control system which provides for readjustment of maintenance time periods as determined by the actual elapsed time periods between maintenance functions.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
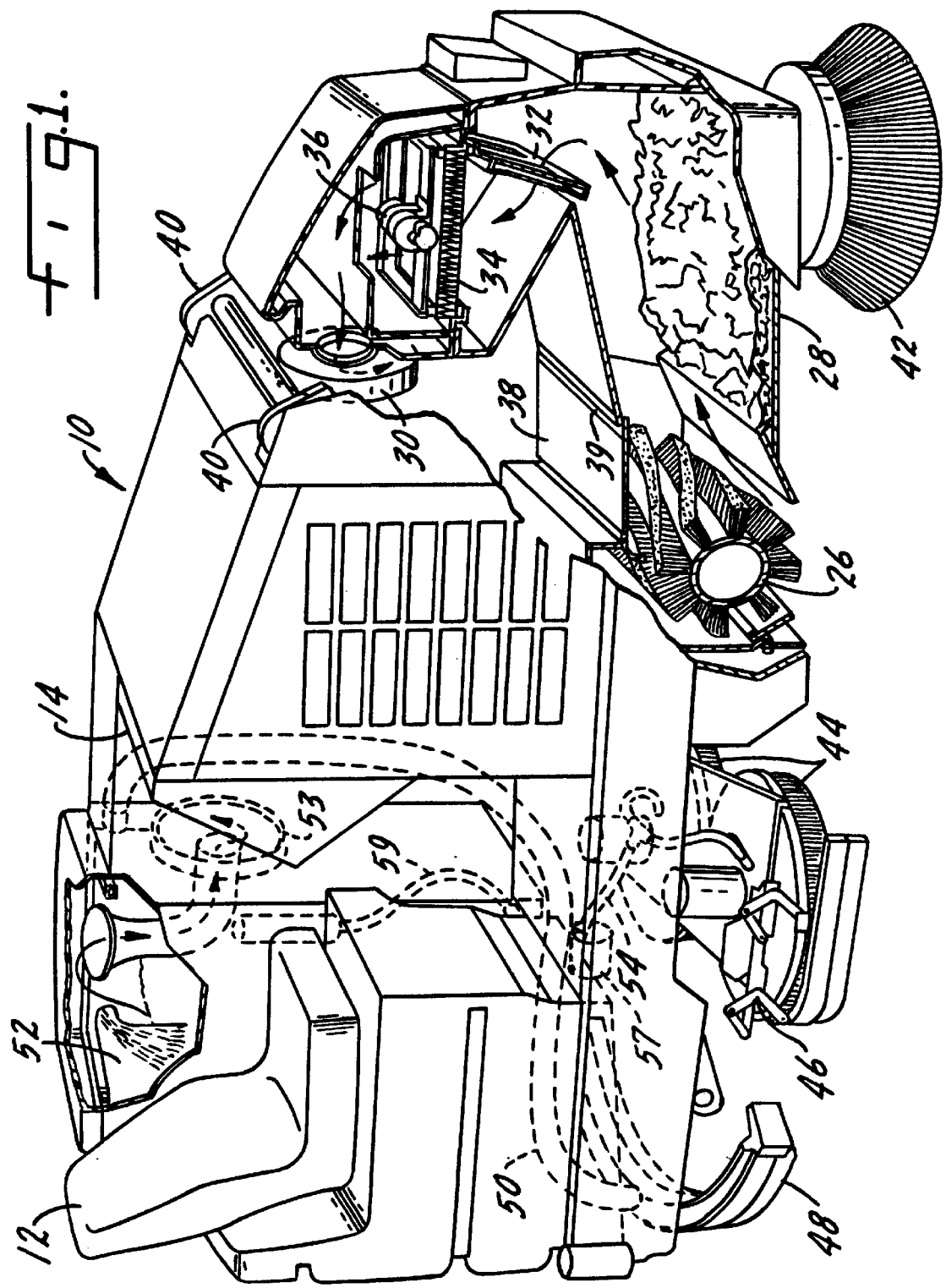
FIG. 1 is a perspective of a surface maintenance machine of the type disclosed herein.
Figure 2:
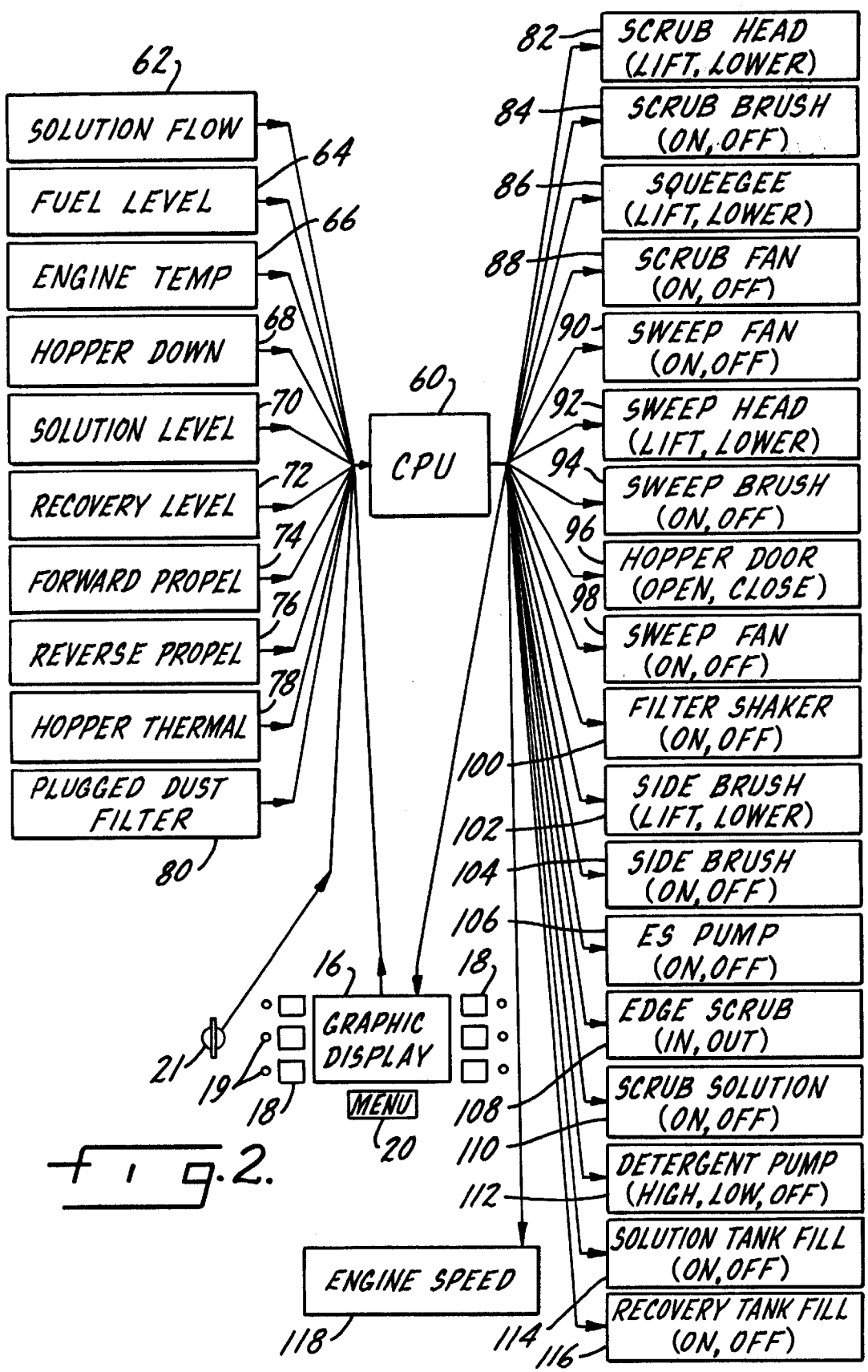
FIG. 2 is a block diagram illustrating the machine sensors, the machine operating controls, the central processing unit, and the operator controls.

The present invention will be described in connection with a surface maintenance machine which provides both sweeping and scrubbing functions. The control system disclosed herein is equally applicable to a machine which only sweeps and to a machine which only scrubs. Sweepers, scrubbers and machines which combine both functions are well known in the art. FIG. 1 diagrammatically illustrates a combination machine of this type and FIG. 2 illustrates the control system for it in block diagram form. The several tables included in the application describe the control system for both operational and maintenance functions in a simplified outline form and should be considered in connection with the block diagram of FIG. 2 and the machine illustration of FIG. 1.

The surface maintenance machine 10 has a driver's seat 12 and the driver will have a control panel 14, a portion of which is illustrated in FIG. 2 as including a graphic display 16, a plurality of multi-function buttons 18, there being six in the example illustrated herein, and a menu control button 20. A light emitting diode (LED) 19 will be adjacent each button. The buttons 18 are at the periphery or along both sides of the display 16 and will each be associated with a particular display sector of the screen as exemplified by FIGS. 3A through 3D. There is a key switch 21 for turning the machine on or off and starting its engine. The display, the multi-function control buttons with their associated LEDs, the menu button and the key switch collectively comprise what is commonly referred to as the "front panel."

The machine 10 will have a drive motor, controlled by the operator to drive the machine in both forward and reverse directions. There are front wheels 22 and rear wheels 24.

The machine has a sweeping brush 26 which will direct debris into a hopper 28. There is an air flow path created by a vacuum fan 30, which path extends through the hopper 28, through a baffle 32, and then through a filter 34. As illustrated by the arrows in FIG. 1, the air flow path is then through the vacuum fan 30, which exhausts to atmosphere. The filter 34 may include a shaker 36 which functions to shake the filter so as to clean it when the need arises. The hopper 28 has a hopper door 38 attached to the hopper with a hinge 39. The door will be open as shown in FIG. 1 during sweeping and will be swung down to close off the entrance opening of the hopper when the hopper is raised for dumping purposes. The dumping mechanism is illustrated in part by the arms 40 which will be used to hydraulically lift the hopper with the door closed and rotate it so the door is at the bottom. Then the door may be opened to dump the debris therein into a suitable refuse container. In addition to the main sweeping brush 26, there is a side brush 42 which will function to direct dust and debris toward the main sweeping brush 26 so as to clear the area adjacent the side of the machine and to direct debris from the side of the machine, through the brush 26, into the hopper 28.

The machine also has scrubbing capability, and for this purpose it has a pair of rotatable scrub brushes 44, which are raised and lowered by a mechanism 46 which will be under the control of the operator. In addition to raising and lowering the scrub brushes 44 the operator may adjust the down pressure or the force that the scrub brushes apply to the underlying surface to be cleaned. The scrub brushes may be centered on the machine, or on occasion they may be moved out somewhat to one side for edge scrubbing along a wall.

There is a squeegee 48 at the rear of the machine. The squeegee will vacuum up soiled cleaning solution and direct it through a conduit 50 to a soiled cleaning solution or recovery tank 52. A vacuum fan 53 draws air from the recovery tank to vacuumize conduit 50. Cleaning solution is supplied to the brushes 44 through a hose 54 which will dispense cleaning solution from a clean water tank 55 in which water is mixed with a suitable detergent. All of the above-described machine elements are old in the art and have been used in machines manufactured by Tennant Company, the assignee of the present application.

The surface maintenance machine 10 will thus include a drive for moving the machine at varying speeds in forward and reverse directions and a sweeping brush to direct debris into a hopper, with the hopper having a door and the hopper being capable of being raised and lowered to dump the debris therein. There is a path for dust control air through the hopper, which path includes a filter, and there are means for shaking or cleaning the filter. The scrubbing portion of the machine includes scrub brushes, which may be raised and lowered, and which may have their down pressure adjusted. There is a squeegee which vacuums the dirty cleaning solution and sends it to a recovery tank. The recovery tank may be of the type which recycles the soiled solution and returns it, at least in part, by pump 57 and conduit 59 to the clean water 55 tank from whence cleaning solution is dispensed to the area of the brushes.

Focusing on FIG. 2, a central processing unit (CPU) is indicated at 60 and it will contain a microprocessor programmed to perform the functions described hereinafter. The CPU 60 receives inputs from the graphic display and from the operator control buttons 18 and 20. These are commands to the CPU to perform certain functions. The machine has a plurality of sensors illustrated in boxes 62 through 80, with these sensors monitoring solution flow, fuel level, engine temperature, hopper position, solution tank level, recovery tank level, forward propulsion, reverse propulsion, hopper temperature, and the condition or cleanliness of the filter 34. Each of these sensors provides an input to CPU 60 and the sensor outputs create preconditions or qualifications for functions to be performed in response to commands from CPU 60.

The outputs from CPU 60 go to boxes 82 through 118, with the outputs commanding certain functions to be initiated to operate the surface maintenance machine. The functions are designated as Scrub head (Lift, Lower); Scrub Brush (on, off); Squeegee (Lift, Lower); Scrub fan (on, off); Sweep fan (on, off); Sweep Head (lift, lower); Sweep brush (on, off); Hopper door (open, close); Sweep Fan (on, off); Filter shaker (on, off); Side Brush (lift, lower); Side Brush (on, off); ES (extended scrub) pump (on, off); Edge Scrub (in, out); Scrub Solution (on, off); Detergent pump (high, low, off); Solution tank fill (on, off); Recovery tank fill (on, off); and Engine Speed.

To summarize, the operator has six multi-function buttons and a menu button and in cooperation with a microprocessor which is suitably programmed to react to the inputs from the designated sensors, the operator is able to control all of the designated functions of the surface maintenance machine.

Figure 3A:
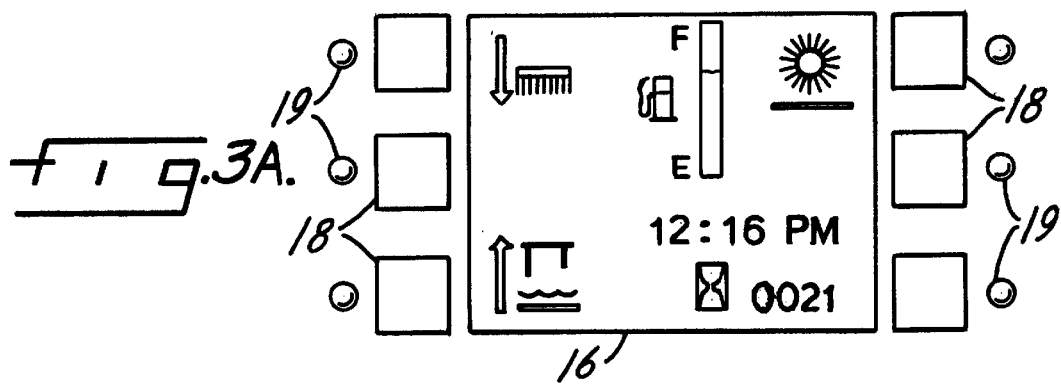
FIGS. 3A–3D are graphic illustrations of different screen displays of the type which will be viewed by the operator when utilizing the control system disclosed herein.
Figure 3B:
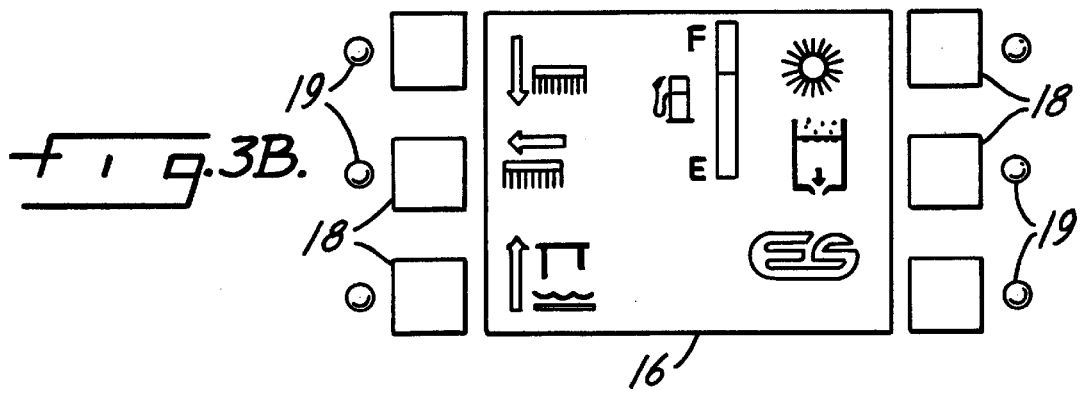
Figure 3C:
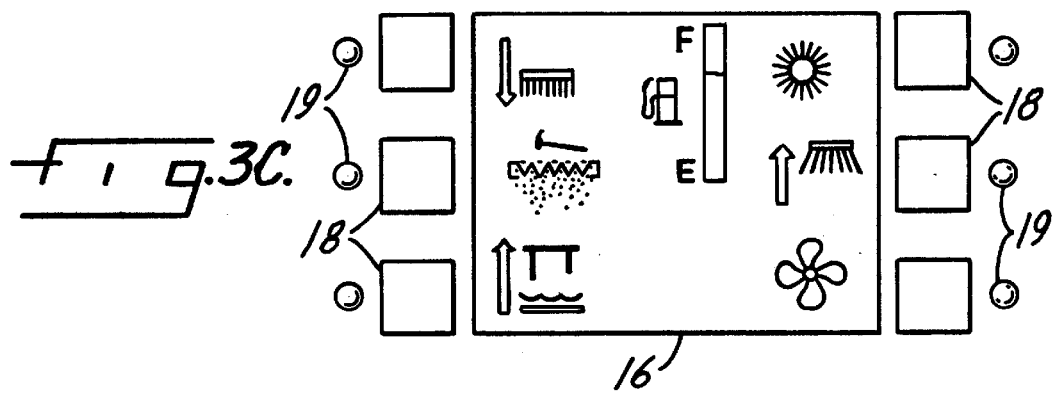
Figure 3D:
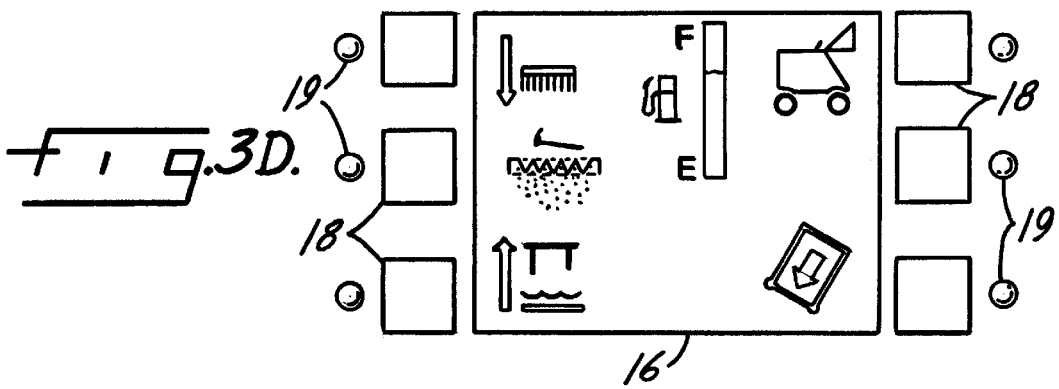

FIGS. 3A through 3D are illustrative of the type of icons which may appear on the display screen 16 in response to the operator successively pushing menu button 20, and which will indicate to the operator what operational functions are available. FIG. 3A is the idle screen and gives the operator the choice of selecting sweep, scrub and water pickup functions. The screen also indicates fuel status and time. FIG. 3B is the scrub screen and this screens adds extended scrub (ES), detergent pump and edge scrub functions to the basic idle screen. Where "ES function" is mentioned it refers to Extended Scrub operation, which is a Tennant Company registered trademark for recycling scrubbing solution recovered from the floor through a filter and back to the clean solution tank for re-use, a method for prolonging the time a machine can scrub between refills of scrubbing solution. The screen of FIG. 3C is the sweep screen and adds the dust control vacuum fan, side brush and filter shaker functions to the idle screen. The screen in FIG. 3D is the hopper up or dump screen and this screen is activated when the hopper is lifted. It gives the operator the ability to open the hopper door and shake the filter. These screens are only illustrative of the multiple different screens which are available to the operator and which will display certain operational and maintenance functions and provide the operator with options to which the operator may respond by use of the six multi-function buttons and the menu button.

Table 1 illustrates the front panel operating modes and is essentially self-explanatory. In every instance in both Tables 1 and 2 in which the column 2 entry indicates an operation of the "logo" key, this is the menu button. In the particular machine manufactured by Tennant Company the company logo surrounds the menu button and hence the button is designated as the logo key. The operator has a choice of an idle mode, a scrub mode, a sweep mode, a hopper up mode and a sweep/scrub mode. The entry sequence for the operator to a particular mode is shown in the second column; the functions available to the operator in that mode are shown in the third column; and the fourth column provides a description of what functions the operator may utilize in a particular mode. The operator may always use the menu button to cycle through the various options which are available.

TABLE 1

Front Panel Operating Modes

| Operating mode | Entry Sequence | Functions available | Description |
| --- | --- | --- | --- |
| Idle Mode | 1. This is the mode in which the panel will normally power up. | 1. Scrub<br>2. No function<br>3. Squeegee<br>4. Sweep<br>5. No function<br>6. No function | The mode gives the operator the basic, sweep, scrub and water pickup modes. |
| Scrub Mode | 1. Pressing the scrub button from the idle mode.<br>2. Pressing the logo button from the idle mode. | 1 Scrub<br>2. Edge scrub<br>3. Squeegee<br>4. Sweep<br>5. Detergent Metering<br>6. ES function | This mode gives the operator control of all scrub functions. |
| Sweep Mode | 1. Pressing the sweep button from the idle mode.<br>2. Pressing the logo button from the scrub mode. | 1. Scrub<br>2. Filter shaker<br>3. Squeegee<br>4. Sweep<br>5. Side brush<br>6. Sweep fan | This mode gives the operator control of all sweep functions. |
| Hopper up Mode | 1. Lifting the hopper (releasing the hopper down switch).<br>2. Pressing the logo button from the sweep mode. | 1. Scrub<br>2. Filter shaker<br>3. Squeegee<br>4. No function<br>5. No function<br>6. Hopper door | This mode gives the operator control of the hopper door. |
| Sweep/Scrub Mode | 1. Pressing the scrub button while in the sweep mode.<br>2. Pressing the sweep button while in the scrub mode | 1. Scrub<br>2. Edge scrub<br>3. Squeegee<br>4. Sweep<br>5. Side brush<br>6. Sweep fan | This gives the operator control of the primary sweep controls, and three primary scrub controls. |

Table 2 illustrates the various maintenance modes which are available to the operator. Again, the first column indicates the mode; the second column the entry sequence for the operator to enter that mode; the third column details the functions available at each of the six buttons in a specific mode; and the fourth column describes what the operator may do in a particular maintenance mode.

TABLE 2

Front Panel Maintenance Modes

| Maintenance mode | Entry Sequence | Functions available | Description |
|---|---|---|---|
| Maintenance 1 mode | 1. Hold logo key<br>2. Turn machine on<br>3. Hold logo key for 15 sec.<br>4. Release logo key | 1. Down pressure reset.<br>2. Down pressure adjust.<br>3. Manual mode<br>4. No function<br>5. No function<br>6. No function | The mode allows the operator to choose from the first three maintenance modes. |
| Maintenance 2 mode | 1. Hold logo key<br>2. Turn machine on<br>3. Hold logo key for 15 sec.<br>4. Release logo key.<br>5. Press and release logo key 2 times. | 1. Input display mode.<br>2. Enable Edge Scrub mode.<br>3. Time Adjust mode.<br>4. No function<br>5. No function<br>6. No function | This mode allows the operator to choose from the second three maintenance modes. |
| Maintenance 3 mode | 1. Hold logo key<br>2. Turn machine on<br>3. Hold logo key for 15 sec.<br>4. Release logo key.<br>5. Press and release logo key 3 times. | 1. Self test mode.<br>2. Check Maint. Mode<br>3. Enable Maint. Mode.<br>4. No function<br>5. No function<br>6. No function. | This mode allows the operator to choose from the last two maintenance modes, or exiting to the idle mode. |
| Maintenance 4 mode | 1. Hold logo key<br>2. Turn machine on<br>3. Hold logo key for 15 sec.<br>4. Release logo key.<br>5. Press and release logo key 4 times. | 1. Language select<br>2. No Function<br>3. No Function<br>4. No Function<br>5. No Function<br>6. No Function | Pressing button 1 will cause the machine to scroll through the different language options. |
| Manual Mode "MAN" indicated on graphic display. | Select Manual Mode from Maintenance 1 screen. | Operator can scroll through the operating modes (Scrub, Sweep, hopper up) using the logo button. From these screens, the user can select individual functions. | Manually operate discrete functions without interlocks. When the manual mode is selected, the machine will return to the idle mode screen. The various individual functions can be selected by scrolling through the operating mode screens using the logo button. |
| Input Display Mode | Select the Input Display mode from the Maintenance 2 screen. | | Display the state of floats, limit switches, and sensors. This mode enables a special display that indicates the various float and input switch levels. The operator can operate the machine in input display mode by scrolling to the operating modes, engaging the desired functions, and scrolling back to the input display mode. |
| Self test mode. | Select the Self Test mode from the maintenance 3 screen. | | This function tests the output portion of the controller board. |
| Pressure Adjust Mode | Select the pressure adjust mode from the Maintenance 1 screen. | 1. Scrub function<br>2. No function<br>3. Squeegee function.<br>4. Increase brush pressure<br>5. No function<br>6. Decrease brush pressure. | Adjust pressure Levels for the three down pressure settings. The level of current flowing to the valve is represented by a bar graph on the display. The neutral headlift feature is disabled in the Pressure adjust mode. |
| Reset Scrub Pressures | Select the reset function from the maintenance 1 screen. | 1. No function<br>2. Reset down pressures<br>3. Do not reset down pressures, exit.<br>4. No function<br>5. No function<br>6. No function | Return the down pressure settings to the factory defaults. |
| Adjust Time Mode | Select Adjust Time | 1. Increment | Set the on board clock and |

TABLE 2-continued

Front Panel Maintenance Modes

| Maintenance mode | Entry Sequence | Functions available | Description |
|---|---|---|---|
| | from Maintenance 2 screen. | segment<br>2. Decrement segment<br>3. Select 24/12 hour clock<br>4. Move cursor right<br>5. Move cursor Left<br>6. No function | calendar. |
| Check Maintenance Mode | Select Check Maint. from Maintenance 2 screen | 1. No function<br>2. No function<br>3. No function<br>4. Clear maint timer<br>5. No function<br>6. No function<br>Logo - select next maint. item | Set the on board calendar |

It should be understood that in every instance in both the operational and maintenance modes that there are certain preconditions to the operator performing a particular function. The sensors indicate to the CPU the conditions of the machine and certain conditions must be satisfied before certain functions can be performed. For example, and as described above, the operator has no control of the hopper door if the machine is in a sweeping function. The operator only has control of the hopper door if the operator has the machine in a hopper up mode for dumping it.

Following is a description of the basic operation of the machine when considering the various operational functions which are available to the operator:

Basic Operation

Each time the panel is turned on, and engine oil pressure is sensed, the following actions will occur:
1. The Hopper door will close.
2. The main brushes will rotate momentarily, and raise.
3. The scrub vac fan will run momentarily, and the squeegee will raise.

Edge Scrub (Scrub, Sweep/Scrub mode)

Pressing the Edge scrub button will toggle the Edge Scrub LED.

If the machine is propelling forward in the scrub mode and the Edge Scrub LED is on, the scrub head will shift into the edge scrub position.

If the Edge Scrub LED is off, the scrub head will return to the retracted position.

Squeegee (Scrub, Sweep/Scrub, Sweep mode)

If the squeegee LED is off, pressing the squeegee button will drop the squeegee and turn on the vac fan.

If the squeegee LED is on, pressing the squeegee button will raise the squeegee, initiate a delay, and turn off the vac fan. Squeegee operation is inhibited in reverse.

Engine speed (all modes)

If the engine is at idle speed, pressing this button will bring it to operating speed.

If the scrub mode is active, pressing the engine button will cancel all scrubbing activities.

If the squeegee is down, pressing the engine button will raise the squeegee and turn off the scrub vac fan.

Scrub (Scrub, Sweep/Scrub, Sweep mode)

If the machine is currently in the idle or sweep modes, pressing the scrub button will initiate the following actions:
1. The engine speed is set high.
2. If the machine is propelling forward, the main brushes will turn on and go down. The down pressure setting will be the same used during the last scrub cycle. The solution will flow at the high, low or zero rate according to the water position switch.
3. If the machine is in reverse, the brusnes will stay up and off.
4. If the machine goes into neutral, the brushes will stay on for a short delay, then shut off and retract.
5. If the Edge Scrub LED is on and the machine is propelling forward, the scrub head will go into the edge scrub position.
6. The scrub vac fan will turn on.
7. If the machine is not in reverse, the squeegee will go down.
8. If the machine is in reverse, the squeegee will stay up until reverse is no longer sensed.
9. If the detergent LED is illuminated, the machine is in forward, and the solution flow valve is turned on, the detergent pump will run. The detergent pump will run at its slow rate if one arrow is present on the Detergent icon. The detergent pump will run at its fast rate if two arrows are present on the Detergent icon.

If the operator pushes and holds the scrub button, the pressure settings will begin to scroll. The pressure setting displayed after releasing the scrub button will become the new default down pressure setting.

If the scrub function was active and the operator pushes, then releases the scrub button, the following actions will take place.
1. The main brushes will turn off and rise.
2. The edge scrub will turn off and retract.
3. The solution flow will turn off.
4. The detergent pump will turn off.
5. A seven second delay will pass, and then the squeegee will rise.
6. A four second delay will pass and the vac fan will turn off.

Detergent (Scrub mode)

Pressing the detergent button will toggle the function on and off. Holding the detergent button will cause the display to scroll through its two speeds. The detergent pump will run only if the main scrub brushes are active, the machine is propelling forward, and the solution switch is on.

1. Off (No arrows present on detergent icon)—detergent pump off.
2. Low (One arrow present on detergent icon)—detergent pump low.
3. High (Two arrows present on detergent icon) - detergent pump High.

ES (Scrub mode)

Pressing the ES button will enable or disable the ES function. In order for the ES float to become active, it must be consistently in the up position for at least 10 seconds. If the ES function is enabled and the ES float becomes active, the following actions will occur.

1. The ES pump will begin to run.
2. The ES pump will continue to run for 40 seconds after the ES float becomes uncovered, or until the solution tank full float becomes covered.

Over Flow (Scrub mode, Sweep/Scrub mode)

In order for the recovery tank float to become active, it must be consistently in the up position for at least 10 seconds. If the scrub or vac fan are active and the tank full float becomes active the overflow icon will appear, the audible alarm will sound for 10 seconds, and the scrub and squeegee functions will be canceled. The overflow icon will not turn off by simple emptying the recovery tank. The scrub or squeegee buttons must be pressed, or the key switch must be cycled.

Main Sweep brush (Sweep mode, Sweep/Scrub mode)

If the operator presses the sweep button while in the idle or scrub modes, the following actions will take place:

1. The hopper door will open.
2. The sweep brush will turn on, and lower.
3. The sweep fan will start.
4. The side brush will turn on, and lower.

Main Sweep brush (Sweep mode, Sweep/Scrub mode)

If the operator presses the sweep button while in the Sweep, or Sweep/Scrub scrub modes, the following actions will take place:

1. The hopper door will close.
2. The sweep brush will turn off, and rise.
3. The sweep fan will stop.
4. The side brush will turn off, and rise.

Side Sweep brush (Sweep mode, Sweep/Scrub mode)

The side brush is automatically engaged each time the sweep system is turned on. The side brush can be disengaged by pressing the side brush button after pressing the sweep button.

Filter Shaker

The Filter Shaker button controls the operation of the filter shaker and timer system.

If the Filter Shaker LED is off, pressing the shaker button will initiate a shake sequence. A shake sequence is defined as follows:
1. The Shaker LED will turn on.
2. The sweep fan will turn off.
3. The filter shaker will start.
4. The filter shaker and LED will remain on for approx. 30 seconds.
5. The filter shaker and LED will turn off.
6. If the sweep fan was engaged before the shake cycle, it will turn on.

If the Filter Shaker LED is on, pressing the shaker button turnsoff the Shaker motor and LED.

A 15 second shake sequence will also be initiated each time the sweep system is turned off.

A shake sequence will be canceled if active while the sweep, or sweep vac fan is turned on.

A shake sequence will be canceled if active,when the engine speed is dropped to idle.

Vac Fan

Pressing the sweep vacuum fan button will enable or disable the fan operation while sweeping.

The sweep fan will only operate if the sweep function is engaged.

Each time the Sweep function is engaged, the fan will be enabled.

Each time the Sweep function is turned off, the fan will be canceled.

The maintenance modes are set forth in Table 2 and when the machine is in a check maintenance mode, which is a function reached by button #2 in the maintenance 3 mode, the screen will give the operator an indication of how many actual operating minutes or hours have elapsed since the last service reminder for a particular service function. For example, at 50 hours the engine oil should be changed; at 100 hours, the coolant system should be flushed; at 200 hours the chassis of the machine should be greased. At 400 hours there should be an engine tune-up; and at 800 hours there should be a change in the hydraulic fluid in the machine. There are certain times when the brushes should be changed in order to insure proper sweeping and scrubbing. These elapsed times are indicated in the check maintenance mode.

The sensors will indicate to the CPU when a particular maintenance item has been accomplished. Assuming the maintenance is performed at the scheduled time interval, the CPU will retain that interval as the time period for a particular maintenance function. However, if the maintenance is performed either substantially earlier or substantially after the required time period, the CPU will recalculate the maintenance interval for a particular maintenance item. For example, assume a brush is to be changed after 50 hours of operation, and for brush operation to be logged, certain preconditions must be met; that is, the machine must be moving at the required speed and the brush must be turning. If, however, the brush is changed at 30 hours, the maintenance interval may change from 50 hours to 40 hours, which is an average of the actual elapsed time and the programmed elapsed maintenance time for that particular item. Assuming that a 30-hour interval continues to be the time period for a brush change, eventually that will be the interval which the CPU will provide on the screen to the operator for changing the brush. Although an average system is the one utilized in the above example, the invention should not be so limited. Any mathematical formula by which the programmed time reaches the actual time may be utilized. It is important for the CPU to be programmed to adjust maintenance intervals, which may be programmed at the factory, to correlate with the actual use of a machine as determined by its operator. All machines will not be used in the same environment and the schedule for particular maintenance items will to a large degree be determined by the actual environment.

The present invention provides a sweeping and scrubbing machine which is designed to offer operator control of only functions which are appropriate for a current task. The intent is to reduce the number of controls confronting the operator and this is accomplished by using multi-function buttons along with the light emitting diodes (LEDs) which are positioned next to the buttons and which provide additional indications to the operator. Each of the buttons is adjacent a particular display sector of the graphic screen 16 and is associated with that part of the screen such that pressing of a particular button will cause the function illustrated by the icon next to the button to be performed.

Whereas the preferred form of the invention has been shown and described herein, it should be realized that there may be many modifications, substitutions and alterations thereto.

The embodiments of the invention in which an exclusive property or privilege is claimed are defined as follows:

1. A surface maintenance machine having a cleaning system including brush means and means for rotating said brush means, means for raising and lowering said brush means, drive means for propelling said surface maintenance machine in forward and reverse directions,
   a visual control screen on said machine positioned for operator use and having a plurality of display sectors, at least some of said display sectors having means for displaying multiple information icons,
   a plurality of operator actuatable control elements, at least some of which are each associated with a specific display sector,
   a central processing unit (CPU) connected to said visual control screen and to said operator control elements, said CPU being connected to said brush means drive means, said means for raising and lowering said brush means and said drive means for propelling said machine,
   a plurality of sensors connected to said CPU and positioned on said machine to determine operating conditions in said cleaning system and in said drive means for propelling said machine,
   microprocessing means in said CPU for evaluating instructions received for operation of said control elements and the operating conditions determined by said sensors, and then issuing commands to said cleaning system for operating said brush means drive means, means for raising and lowering said brush means and said means for propelling said machine.

2. The surface maintenance machine of claim 1 wherein one of said control elements is a menu control, the successive operation of which will display different cleaning system options for use by an operator.

3. The surface maintenance machine of claim 2 wherein said cleaning system includes a scrub brush, a source of cleaning solution, a squeegee, means for raising and lowering the squeegee, and a recovery water container.

4. The surface maintenance machine of claim 2 wherein said cleaning system includes a sweeping brush, and a debris hopper.

5. The surface maintenance machine of claim 4 wherein said cleaning system includes means for raising and lowering said debris hopper, a hopper door, and means for opening and closing said hopper door.

6. The surface maintenance machine of claim 4 wherein said cleaning system includes a dust filter and means for applying a cleaning shaking force thereto.

7. The surface maintenance machine of claim 1 wherein said cleaning system includes a scrub brush, a source of cleaning solution, a squeegee, means for raising and lowering the squeegee, a recovery water container, a sweeping brush, a debris hopper, means for raising and lowering said debris hopper, a hopper door, and means for opening and closing said hopper door.

8. The surface maintenance machine of claim 1 wherein one of said control elements is a menu control, the successive operation of which will display different machine maintenance options for use by an operator.

9. The surface maintenance machine of claim 8 wherein successive operation of said menu control element will display different cleaning system options and different machine maintenance options for use by an operator.

10. The surface maintenance machine of claim 8 wherein said maintenance options include adjustment of brush means pressure on the surface being cleaned.

11. The surface maintenance machine of claim 8 wherein said maintenance options include displaying the status of portions of said cleaning system.

12. The surface maintenance machine of claim 8 wherein said microprocessor includes data as to the elapsed machine operating time before designated maintenance functions should be performed and means for displaying the required maintenance function after said elapsed time on said visual control screen in response to operation of said menu control element.

13. The surface maintenance machine of claim 12 wherein each time certain maintenance functions are performed, the sensors provide an indication thereof to said microprocessor, the elapsed time for that function is compared with the data stored in the microprocessor as to the recommended elapsed time for that function, if the actual elapsed time is different from the stored elapsed time, the microprocessor alters the stored elapsed time for that maintenance function to reflect the change between the actual elapsed time and the stored elapsed time.

* * * * *